Nov. 10, 1964     H. A. STEINBERG     3,156,234
SOLAR OVEN WITH PLASTIC CASING AND HINGES
Filed Jan. 10, 1962     2 Sheets-Sheet 1
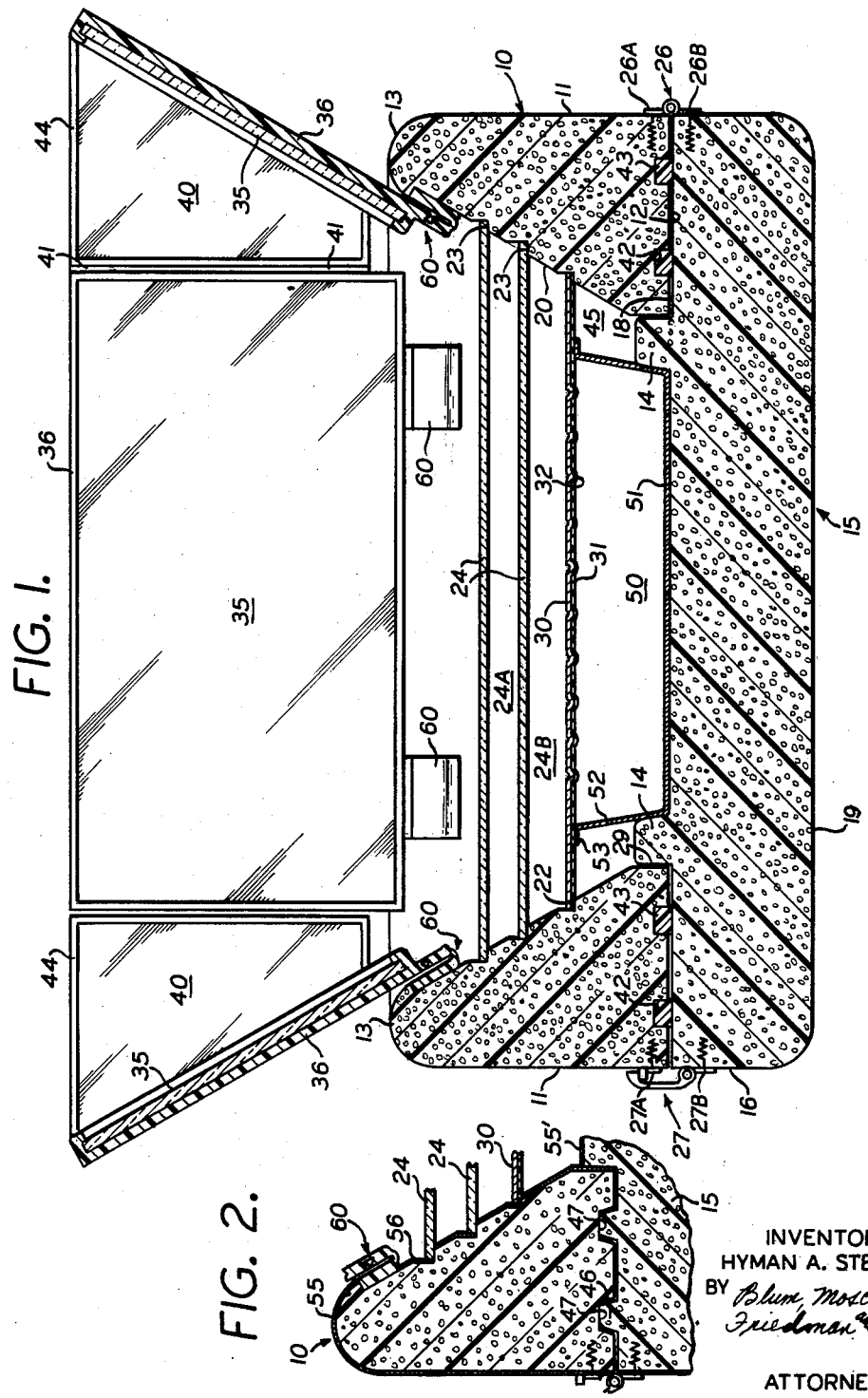
INVENTOR
HYMAN A. STEINBERG
ATTORNEYS.

Nov. 10, 1964   H. A. STEINBERG   3,156,234
SOLAR OVEN WITH PLASTIC CASING AND HINGES
Filed Jan. 10, 1962   2 Sheets-Sheet 2
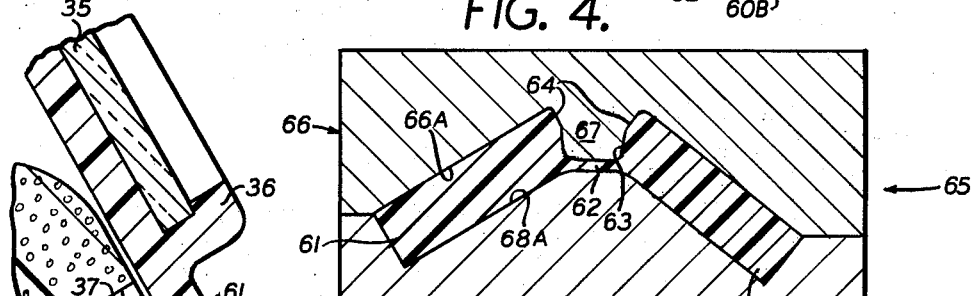
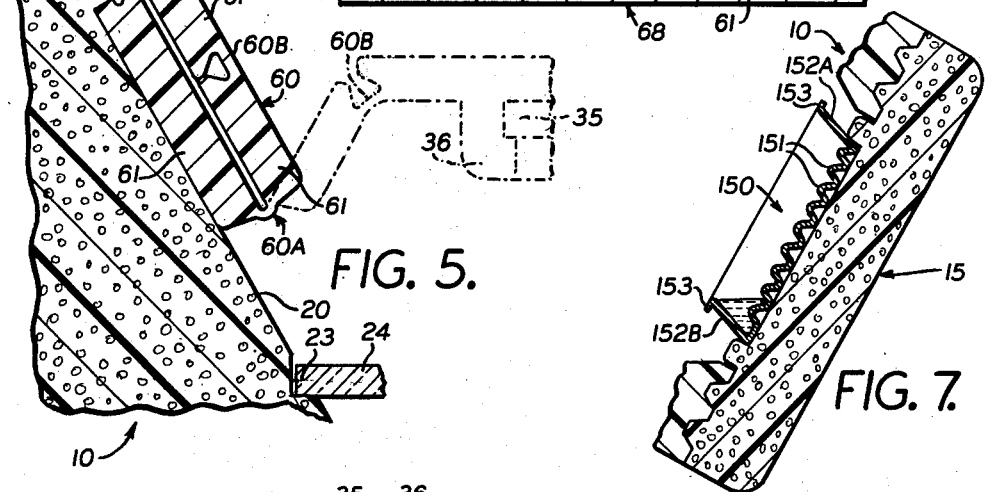
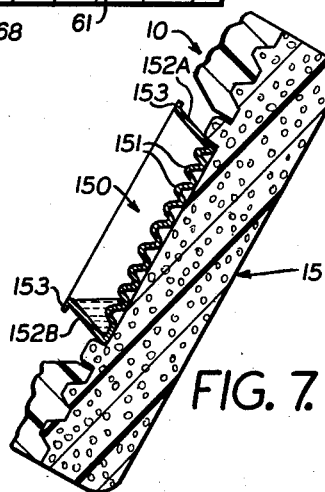
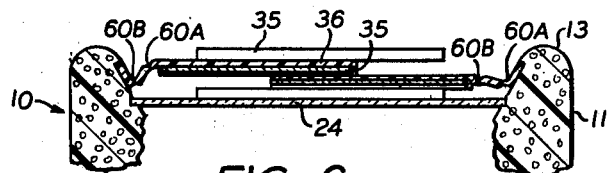
INVENTOR
HYMAN A. STEINBERG
BY *Blum, Moscovitz,*
*Friedman and Blum*
ATTORNEYS.

United States Patent Office 3,156,234
Patented Nov. 10, 1964

3,156,234
SOLAR OVEN WITH PLASTIC CASING
AND HINGES
Hyman A. Steinberg, 7—25 166th St., Whitestone, N.Y.
Filed Jan. 10, 1962, Ser. No. 165,351
10 Claims. (Cl. 126—270)

This invention relates to solar ovens and, more particularly, to improvements in the solar oven shown, described and claimed in my copending application Serial No. 142,953, filed October 4, 1961, for Solar Oven Construction, now Patent No. 3,106,201, issued October 8, 1963, and of which the present application is, insofar as common subject matter is concerned, a continuation-in-part. The present application is also, insofar as common subject matter is concerned, a continuation-in-part of my copending application Serial No. 743,156, filed June 19, 1958, for Solar Oven and now Patent No. 3,025,851 issued March 20, 1962.

The solar oven of my copending applications is featured by reflective walls extending inwardly of a casing at substantially 120 degree angles to a flat black collector plate, whereby substantially all of the radiation entering through the open side of the casing, as defined by the reflective walls, is directed solely to the collector plate. There is a food receiving chamber within the casing inwardly of, and in heat receiving contiguous relation with, the collector plate. This chamber is spaced from the opposite side of the casing and is contiguous to or formed with the collector plate over less than the entire area thereof so as to amplify the relative transfer of heat from the collector plate to the chamber.

Further, the internal side walls of the casing are extended substantially below the collector plate and are surfaced with a heat reflecting film or coating. Thereby they form, with the food receiving chamber, an annular air space inwardly of the collector plate and surrounding the food receiving chamber. Due to its contact with the black collector plate, this air space contains a circulating mass of heated air which surrounds the chamber and thus contributes to the transfer of additional heat thereto. The extensions of the side walls, due to their reflective nature, also contributes to the transfer of heat by reflection of radiation from the collector plate to the food chamber.

The present invention relates to improved constructional features of a solar oven of this type, whereby its efficiency is greatly increased and its construction and assembly rendered less expensive. More particularly, the inner surface of the collector plate, which forms a surface of the heat receiving chamber, is coated with a suitable fluorocarbon plastic such as "Teflon" or one of the silicone compositions. This plastic coating prevents food from sticking to the surface of the collector plate. Furthermore, the coating, which may also be a paint or the like, increases the emissivity of the collector plate in the direction of the heating chamber, and thereby increases the amount of heat transferred from the collector plate to the heating chamber.

A further advantageous result of the use of the coating on the collector plate, with its corresponding increase in radiation into the heating chamber, is the maintenance of a more uniform temperature within the heating chamber by reducing the differential in temperature between, for example, the edges or periphery of the chamber and the center thereof.

A further improvement, in accordance with the present invention, is the deformation of the collector plate to form ridges or ribs which project into the food chamber. These ridges or ribs will form dark lines on any food which may be in contact with the collector plate. The ridges are covered with the coating, such as the plastic coating, in the same manner as is the rest of the collector plate.

In the solar oven described in my copending applications, an outer casing is provided, and heat insulating material is disposed between the outer casing and the reflective walls, heating chamber and the like. In accordance with the present invention, such an outer casing is eliminated, and the door providing access to the food chamber is simplified in construction, by forming all of that portion of the solar oven outside of the heat reflective walls of a molded plastic, such as a rigid foamed urethane, phenolic, epoxy, silicone or other foamed plastic resin. The necessary configurations for supporting the heating chamber and for supporting the several plates, such as the glass plates and the collector plate, are molded directly into the surface of this rigid foam "casing." The door itself is molded of the rigid foam plastic and is provided with suitable configurations into which the food chamber may be set and which will hold the latter in position. By this type of construction, the outer casing and the heat insulating material are formed as a unitary assembly, thereby greatly decreasing the cost of constructing and assembling the solar oven.

As an additional feature, all of the hardware, such as the door hinges and the door latch, may be pre-set into position during formation of the combined insulation and outer casing. To provide a seal for the prevention of loss of heated air from the heating or food chamber, a series of mating grooves may be molded into the plastic casing and door, or resilient foam plastic strips may be seated in appropriate grooves or the like molded into the rigid foam plastic casing or door.

As an incidental feature of the invention, the hinges for the mirrors are formed out of plastic in a manner which permits the mirrors to be folded flat in a narrow space above the outer transparent plate of the oven. In addition to a lower or inner molded-in hinge which permits the mirrors to fold inwardly, an upper hinge with molded-in restricted rotation permits the mirrors to lie flat in closed position in overlapped flat planes.

Still another feature of the invention is the evacuation of one or more of the spaces defined by the collector plate and the transparent plate or plates. This evacuation reduces convection losses which might otherwise occur in these chambers. While the spaces may remain evacuated, it is within the scope of the invention first to evacuate these spaces, and then to re-fill them with a suitable gas which is less heat conductive than air, such as, for example, "Freon."

The inner surfaces of the molded foam rigid plastic are preferably metalized, as by covering the same with metallic tape, by spraying the same with metallics, or by forming the casing within a transparent plastic liner or skin which has a metalized inner surface, thereby providing heat reflective-surfaces facing inwardly of the solar oven. This liner or skin may also be an opaque, colored plastic which serves as a decorative and protective covering for the surfaces of the casing. Appropriate portions of the liner of the casing may be permitted to remain on the outer surface of the rigid foam plastic but may be stripped away from the inner surface thereof. The stripped surfaces may then be metalized with silver, for example, in a known manner.

Another novel feature of the invention is that the outwardly facing surface of the collector plate upon which the solar radiation impinges, is initially polished or made highly reflective before being blackened as by having a coating of black paint or the like applied thereto. This decreases the emissivity of the collector plate, particularly in the infrared region, without decreasing its absorptivity for solar energy.

For an understanding of the principles of the invention, reference is made to the following description of typical embodiments thereof as illustrated in the accompanying drawings. In the drawings:

FIG. 1 is a vertical sectional view through a solar oven embodying the invention;

FIG. 2 is a partial vertical sectional view illustrating a modification of the invention;

FIG. 3 is a greatly enlarged partial side elevational view of the hinge construction for the mirrors;

FIG. 4 is a partial vertical sectional view illustrating the formation of the restricted rotation hinge:

FIG. 5 is a partial vertical sectional view through the solar oven showing the hinging of the mirrors to the casing;

FIG. 6 is a reduced vertical sectional view through the oven showing the mirrors in the closed or folded position; and FIG. 7 is a partial vertical sectional view of the cover of the solar oven illustrating a modification of the food chamber.

In the drawings, only such parts of the solar oven are shown as are necessary for an understanding of the present invention, and reference is made to my copending application for details of other parts of the solar oven forming no part of the present invention.

Referring to the drawings, the solar oven includes a casing 10 of generally rectangular external configuration. Casing 10 is molded of a suitable rigid foam plastic material, such as the aforementioned urethane, phenolic, silicone, or epoxy resins, so as to have an outer side wall 11, a bottom wall surface 12, and sloping inner wall surfaces 20. Wall surfaces 20 slope inwardly at an angle of approximately 30 degrees to the outer side wall surfaces 11 of the casing 10 and thus extend at an angle of substantially 120 degrees to the bottom wall surface 12 of casing 10.

A door 15 is hinged to the casing 10 and is likewise molded of a rigid foam plastic material, such as urethane or other resin. Door 15, which is generally rectangular in external configuration, has outer side surfaces 16, an inner surface 18, and an outer surface 19 which is substantially parallel to the surface 18. The side surfaces 16 may merge with the bottom surface 19 by curved transistion surfaces. Door 15 is hinged to casing 10 by hinges 26, comprising parts 26A and 26B respectively embedded in place during the molding of casing 10 and of door 15. The door 15 may be latched in place by a suitable latch 27, including a part 27A embedded in place with the casing 10 and a part 27B embedded in position with the door 15.

It will be noted that outer surfaces 11 of casing 10 merge with the inner surfaces 20 over curved transistion portions 13 at the upper edges of both surfaces. At a point some distance above the bottom surface 12 of casing 10, surfaces 20 are formed with an intermediate step or steps 23, shown as two in number in the illustrative example. Steps 23 support flat transparent glass or plastic plates 24 which permit solar energy to pass therethrough but block re-radiation of infrared energy from the collector plate, whereas steps 22 support the metal collector plate 30. The lower ends of inner surfaces 20 are formed with portions 29 which are substantially parallel to the outer surfaces 11 of casing 10, and define an opening 31. It will be noted that walls 20 define a cavity extending inwardly from the operatively open outer end of the casing 10, by means of which solar energy may be reflected onto the collector plate 30.

Four reflecting plates or mirrors 35 are provided, these reflecting plates or mirrors being supported within plastic frames 36, and the frames 36 are hingedly connected to the inner surfaces 20 of casing 10 above ledges 23 by means of hinges 60 which are integral with the plastic frames. The frames 36 and the integral hinges 60 are molded of a suitable plastic composition material, such as polyethylene or polypropylene. As will be described, the hinges 60 are so arranged that, in the operative position of the oven when the mirrors 35 are open, the plane of each mirror is at an inner angle of 120 degrees with respect to the collector plate 30, and this angle is maintained by rotation "restriction" built into the hinges 60. Each main mirror 35 hingedly supports a generally trapezoidal corner mirror 40, each corner mirror 40 being hingedly connected to one edge of a main mirror 35 as by hinge means indicated at 41 and which may likewise be formed integral with the plastic frames 36. For this purpose, the corner mirrors 40 may be supported in plastic composition material frames 44.

The construction and operation of hinges 60 is best illustrated in FIGS. 3 through 6. As best shown in FIG. 3, each hinge 60 includes a first hinge portion 60A and a second hinge portion 60B. The hinge portion 60A offers substantially unrestricted movement of the hinge leaves 61 through 180 degrees in one direction and through a substantially smaller angle in the opposite direction, whereas the hinge portion 60B allows substantially 180 degree movement in one direction but, in the opposite direction, restricts the movement of the leaves to a position in which the leaves 61 are substantially coplanar. It will further be noted that hinge portion 60A faces in the opposite direction from that of hinge portion 60B.

The type of plastic hinge shown at 60A is known to the art. It is constructed in a known manner by a molding operation in which the leaves 61 are disposed in the same plane and the thinned "pintle" portion 62 is provided by reduction of the thickness of the overall body at this point. However, it will be apparent that such a technique cannot be used for forming the hinge portion 60B in which inwardly converging edge portions 63 extend from opposite ends of the thinned portion 62 and merge into parallel abutting surfaces 64 which are perpendicular to the general plane of the leaves 61 and serve to limit the movement of these leaves, in the "closing" direction, to a position in which they are substantially coplanar.

For the formation of the hinge portion 60B, the technique illustrated in FIG. 4 must be used. In this figure, it will be noted that the leaves 61 are formed in non-coplanar relation, such as in parallel relation or at an obtuse angle to each other, rather than being coplanar. These leaves are formed in cavities 66A and 68A of mold sections 66 and 68 of a mold 65. The mold section 68 has a part 67 conforming to the surfaces 62, 63, and 64 of the leaves 61 at the hinge 60B.

The combination of the hinge section 60A and the hinge section 60B assures full opening of the mirrors 35, with the hinge 60B restricting such opening movement to the mentioned angle of 120 degrees with respect to the collector plate. It will be noted that one of the "leaves" 61 of each hinge 60 is disposed adjacent an inner surface 20 of the casing and may have its end seated against a shoulder 37 on the inner surface of the casing.

The inner surfaces 20 of the casing are made heat reflective as by covering the surfaces with metallic tape, for example, or by spray metalizing the inner surfaces. Collector plate 30, the lower portions of the sloping inner surfaces 20 of casing 10, and the vertical surfaces 29 of the inner surface 20 define a space 45 to which access is afforded when the door 15 is in the open position. Due to the specific angular relationship of the mirrors 35 to the collector plate 30, and to provision of reflecting surfaces on the inner surfaces 20 of the casing 10, substantially all of the solar energy received is directed onto the collector plate 30, where it is converted into thermal energy which is transferred by conduction, convection and radiation to the food receiving chamber 50 disposed within the space 45. Maintenance of the high temperature in the space 45 and in the chamber 50 is facilitated by the heat insulating effect of the rigid foam plastic material of the casing 10 and the rigid foam plastic material of the cover 15.

In the particular example shown in the drawings, the food chamber includes a portion of the collector plate 30 and a food tray or container 50 which is preferably formed of relatively light or thin heat conductive material, such as metal foil. For example, container 50 may be formed of aluminum foil. The container includes a bottom wall 51 and preferably outwardly flared side walls 52 which may have flanges as indicated at 53. The height of container 50 is such that, when it is supported upon the door 15, the edges or flanges of the container 50 are in direct contact with the surface of collector plate 30. As set forth in my copending applications, the area of collector plate 30 enclosed by the flanges 53 of the container 50 may amount advantageously to be between one-quarter and three-quarters of the effective area of the collector plate 30. Also, the volume of the food chamber, in cubic inches, is preferably between 0.5 and 1.5 times the effective area, in square inches, of collector plate 30.

By reference to my copending applications, it will be noted that the solar oven, when set up for use, is usually tilted substantially from the horizontal so as to face directly toward the sun. This means that, under conditions of normal use, the food container 50 will similarly be tilted substantially from the horizontal, as indicated in FIG. 7. Under such conditions, food juices, gravy and the like would tend to run out of the lower end of the food container. For this purpose, a food container 150 as shown in FIG. 7 is preferably used. In FIG. 7, food container 150 is illustrated as having a ribbed or corrugated bottom wall 151 and side walls 152A and 152B provided with flanges 153. However, it will be noted that, whereas side wall 152A extends either substantially normal to the general plane of the bottom wall 151, or even at an angle greater than 90 degrees with respect thereto, the "lower" side wall 152B extends at preferably an acute angle, and at an angle not exceeding about 100 degrees, to the general plane of the bottom wall so as to form a recess for receiving and retaining food juices and other liquids when the solar oven is tilted as stated. As set forth in my copending application Serial No. 743,156, the ribbed or corrugated bottom wall 151 prevents certain items, such as frankfurters or sausages, from rolling to one end of the food container when the solar oven is tilted.

In accordance with the invention, the surface of collector plate 30 facing the food chamber is coated with a suitable plastic material, such as the fluorocarbon "Teflon" or one of the silicone compositions, as indicated at 31. This coating is designed to prevent food from sticking to the surface of the collector plate forming the upper surface of the heating chamber. In addition, collector plate 30 is preferably formed with ribs 32 having their peaks directed into the heating chamber. These ribs or ridges concentrate the heat from the collector plate into narrow areas which will form dark lines and the like on food which may be in contact with the collector plate. The ridges are formed in the metal of collector plate 30 before the plastic coating is applied to the heating chamber surface of this collector plate, so that the ribs are covered by the plastic coating.

In addition, this plastic coating increases the amount of heat which is radiated from the collector plate in the direction of the heating chamber. As a corollary, this increase in radiation into the heating chamber results in a more uniform temperature being maintained therein so that there is no extensive temperature differential between, for example, the edges of the chamber and the center of the chamber.

As a further feature of the invention, the surface of collector plate 30 facing toward the sun's rays is initially polished or made highly reflective before being blackened, as by having a coating of black paint applied thereto, for example. This decreases the emissivity of the collector plate, particularly in the infrared region, and thus decreases the amount of heat lost outwardly by radiation to the transparent plate.

To properly position the heating chamber 50, the inner surface of door 15 is formed with a rib or ribs 14 enclosing an area congruent with the external dimensions of the chamber 50. Rib 14 is molded integrally with the door 15 during the molding of the latter. Also, during the molding of the casing 10, the latter is formed with substantially rectangular cross section grooves or recesses 42 which receive substantially rectangular cross section sealing strips 43 of resilient foam plastic material. The initial cross sectional area, or at the least the height, of the strips 43 is somewhat in excess of the depth of the recesses or grooves 42. Thereby, when door 15 is closed, the inner surface 18 of the door engages and compresses the strips or gaskets 43 to form a tight seal preventing air circulation and thereby decreasing any possible loss of heat. An alternate arrangement for preventing air circulation and decreasing any possible loss of heat due thereto, is illustrated in FIG. 2 wherein the door 15 is formed with ribs 46 interfitting into grooves 47 in the casing 10. Alternatively, the ribs may be formed on the casing and the grooves may be formed in the door.

FIG. 2 illustrates a further modified form of the invention and in this feature parts corresponding to or identical with those shown in FIG. 1 have been given the same reference characters. The second difference between the embodiment of the invention shown in FIG. 2 and that shown in FIG. 1 is that, during the molding of the casing 10, the mold is provided with a liner 55 having an outer surface which may be colored or otherwise made attractive. A similar lining 55' also may be used in the molding of the cover 15. When casing 10 is removed from the mold, the liner 55 is stripped from the inner surface 20 of the casing 10, and the latter then has applied thereto a reflective coating 56 by metalizing in a known manner, for example by using silver. Thereby, the solar oven is readily provided with an attractive appearing exterior finish as well as a reflective interior surface.

In both embodiments of the invention, the space between the two plates 24 and that between the inner plate 24 and the collector plate 30 may be evacuated. This reduces convection losses which might occur in these intermediate chambers indicated at 24A and 24B, respectively. The spaces 24A and 24B may remain evacuated or they may be filled with a suitable gas, such as a "Freon," which is less heat conductive than air.

While specific embodiments of the invention have been shown and described in detail to illustrate the application of the principles of the invention, it will be understood that the invention may be embodied otherwise without departing from such principles.

What is claimed is:

1. A solar oven comprising, in combination, a generally polygonal casing of rigid foamed plastic heat insulating material having an opening therethrough extending between and through a pair of substantially parallel outer end surfaces and bounded by side walls having inner surfaces; a flat, black and opaque metal collector plate extending between said inner surfaces intermediate said end surfaces and substantially parallel to the latter; said collector plate dividing said casing opening into a cavity, opening through one end surface, and receiving radiation entering through the opening in such one end surface, and a space having an access opening through the other end surface and in heat transfer relation with said collector plate; means, including said collector plate, defining a food receiving chamber within said space, said chamber being in contiguous relation with less than the entire area of said collector plate between said inner surfaces, to amplify the relative transfer of heat from said collector plate to said food receiving chamber; and a heat insulating door substantially coextensive with said other end surface of said casing and hinged to said casing and effective to close the access opening to said food receiving chamber; the inner surface of said collector plate, facing said space and said food receiving chamber, being coated with a plastic composition material effective to prevent food from sticking to the inner surface of said collector plate.

2. A solar oven comprising, in combination, a generally polygonal casing of rigid foamed plastic heat insulating material having an opening therethrough extending between and through a pair of substantially parallel outer end surfaces and bounded by side walls having inner surfaces; a flat, black and opaque metal collector plate extending between said inner surfaces intermediate said end surfaces and substantially parallel to the latter; said collector plate dividing said casing opening into a cavity, opening through one end surface, and receiving radiation entering through the opening in such one end surface, and a space having an access opening through the other end surface and in heat transfer relation with said collector plate; means, including said collector plate, defining a food receiving chamber within said space, said chamber being in contiguous relation with less than the entire area of said collector plate between said inner surfaces, to amplify the relative transfer of heat from said collector plate to said food receiving chamber; and a heat insulating door substantially coextensive with said other end surface of said casing and hinged to said casing and effective to close the access opening to said food receiving chamber; said collector plate being formed with substantially parallel ridges defining ribs projecting into said space and into said food receiving chamber.

3. A solar oven, as claimed in claim 2, in which the inner surface of said collector plate, including said ribs, is coated with a plastic composition material effective to prevent food from sticking to the inner surface of said collector plate.

4. A solar oven, as claimed in claim 2, in which said means defining said heat receiving chamber includes a metallic food container which is substantially rectangular in plan and has side walls in engagement with said collector plate; the inner surface of said door being formed with a recess conformingly seating said container; the depth of said container being such that food therein is in contact with said collector plate.

5. A solar oven comprising, in combination, a generally polygonal casing of rigid foamed plastic heat insulating material having an opening therethrough extending between and through a pair of substantially parallel outer end surfaces and bounded by side walls having inner surfaces; a flat, black and opaque metal collector plate extending between said inner surfaces intermediate said end surfaces and substantially parallel to the latter; said collector plate dividing said casing opening into a cavity, opening through one end surface, and receiving radiation entering through the opening in such one end surface, and a space having an access opening through the other end surface and in heat transfer relation with said collector plate; means, including said collector plate, defining a food receiving chamber within said space, said chamber being in contiguous relation with less than the entire area of said collector plate between said inner surfaces, to amplify the relative transfer of heat from said collector plate to said food receiving chamber; and a heat insulating door substantially coextensive with said other end surface of said casing and hinged to said casing and effective to close the access opening to said food receiving chamber; the outer surface of said collector plate being initially highly heat reflective and being covered with a black coating.

6. A solar oven comprising, in combination, a generally polygonal casing of rigid foamed plastic heat insulating material having an opening therethrough extending between and through a pair of substantially parallel outer end surfaces and bounded by side walls having inner surfaces; a flat, black, and opaque metal collector plate extending between said inner surfaces intermediate said end surfaces and substantially parallel to the latter; said collector plate dividing said casing opening into a cavity, opening through one end surface, and receiving radiation entering through the opening in such one end surface, and a space having an access opening through the other end surface and in heat transfer relation with said collector plate; means, including said collector plate, defining a food receiving chamber within said space, said chamber being in contiguous relation with less than the entire area of said collector plate between said inner surfaces, to amplify the relative transfer of heat from said collector plate to said food receiving chamber; a heat insulating door substantially coextensive with said other end surface of said casing and hinged to said casing and effective to close the access opening to said food receiving chamber; in which said heat insulated door comprises a molded piece of rigid foam plastic heat insulating material; and said casing and said door having substantially planar surfaces mating in the closed position of said door; one of said mating surfaces having at least one substantially rectangular cross sectional groove therein; a sealing strip of resilient foamed plastic material, of substantially rectangular cross section, seated in said groove and projecting therebeyond for engagement by the other of said mating surfaces, in the closed position of the door, to form a tight seal between said casing and said door preventing circulation of air within said space and said food receiving chamber.

7. A solar oven comprising, in combination, a generally polygonal casing of rigid foamed plastic heat insulating material having an opening therethrough extending between and through a pair of substantially parallel outer end surfaces and bounded by side walls having inner surfaces; a flat, black, and opaque metal collector plate extending between said inner surfaces intermediate said end surfaces and substantially parallel to the latter; said collector plate dividing said casing opening into a cavity, opening through one end surface, and receiving radiation entering through the opening in such one end surface, and a space having an access opening through the other end surface and in heat transfer relation with said collector plate; means, including said collector plate, defining a food receiving chamber within said space, said chamber being in contiguous relation with less than the entire area of said collector plate between said inner surfaces, to amplify the relative transfer of heat from said collector plate to said food receiving chamber; a heat insulating door substantially coextensive with said other end surface of said casing and hinged to said casing and effective to close the access opening to said food receiving chamber; in which said heat insulated door comprises a molded piece of rigid foam plastic heat insulating material; and said casing and said door having generally planar surfaces mating in the closed position of said door; said mating surfaces being formed with interfitting rib and groove formations to provide a tight seal between said casing and said door for preventing circulation of air within said space and said food receiving chamber.

8. A solar oven comprising, in combination, a generally polygonal casing of rigid foamed plastic heat insulating material having an opening therethrough extending between and through a pair of substantially parallel outer end surfaces and bounded by side walls having inner surfaces; a flat, black, and opaque metal collector plate extending between said inner surfaces intermediate said end surfaces and substantially parallel to the latter; said collector plate dividing said casing opening into a cavity, opening through one end surface, and receiving radiation entering through the opening in such one end surface, and a space having an access opening through the other end surface and in heat transfer relation with said collector plate; means, including said collector plate, defining a food receiving chamber within said space, said chamber being in contiguous relation with less than the entire area of said collector plate between said inner surfaces, to amplify the relative transfer of heat from said collector plate to said food receiving chamber; and a heat insulating door substantially coextensive with said other end surface of said casing and hinged to said casing and effective to close the access opening to said food receiving chamber; said means defining said food receiving chamber including a metallic food container which is substantially rectangular in plan and has walls in engagement with said collector plate; the inner surface of said door being formed with a recess conformingly sealing said container; said casing and door being mounted for tilting out of the horizontal plane in order that said radiation receiving cavity face the sun's rays; that side wall of said container which is normally lower in the tilted position of said casing forming an inner angle with the base of said container less than that formed by the normally upper wall of the container.

9. A solar oven, as claimed in claim 8, in which said normally lower side wall extends at an inner angle of not exceeding 100 degrees to the base of said container, for retaining food juices in said container irrespective of the tilt of the solar oven.

10. A solar oven comprising, in combination, a generally polygonal casing of rigid foamed plastic heat insulating material having an opening therethrough extending between and through a pair of substantially parallel outer end surfaces and bounded by side walls having inner surfaces; a flat, black and opaque metal collector plate extending between said inner surfaces intermediate said end surface and substantially parallel to the latter; said collector plate dividing said casing opening into a cavity, opening through one end surface, and receiving radiation entering through the opening in such one end surface, and a space having an access opening through the other end surface and in heat transfer relation with said collector plate; means, including said collector plate, defining a food receiving chamber within said space, said chamber being in contiguous relation with less than the entire area of said collector plate between said inner surfaces, to amplify the relative transfer of heat from said collector plate to said food receiving chamber; a heat insulating door substantially coextensive with said other end surface of said casing and hinged to said casing and effective to close the access opening to said food receiving chamber; reflecting mirrors hinged to said casing at the outer end of said radiation receiving cavity and arranged to be moved selectively between first positions closing said radiation receiving cavity and second positions forming substantially coplanar extensions of said inner surfaces; said inner surfaces bounding said cavity converging inwardly toward said collector plate; and a plastic frame mounting each of said mirrors; said frames being hinged to said casing by plastic hinge means integral with said frames; each of said plastic hinge means including a first leaf superposed on an inner surface of said casing and a first thinned portion connecting said first leaf to an intermediate leaf; each hinge means further including a second leaf substantially coplanar with the associated frame and connected to said intermediate leaf by a second thinned portion; each of said thinned portions being coplanar with a different outer surface of said intermediate leaf and including an outwardly opening recess; the opposite walls of the recess associated with said first thinned portion being substantially parallel and the opposite walls of the recess associated with said second thinned portion converging toward each other outwardly of said thinned portion to form abutting surfaces limiting the movement of said second leaf in one direction to a first position substantially coplanar with said intermediate leaf; whereby each second thinned portion provides for movement of the associated mirror to a position in which it is substantially parallel to the plane of the associated inner surface in said radiation receiving cavity, and said first and second thinned portions permit movement of said mirrors between said second mentioned positions and said first positions whereby the mirrors may be overlapped in any selected relation in the closed position.

References Cited by the Examiner

UNITED STATES PATENTS

| 2,746,087 | 5/56  | Dolezal    | 18—48   |
| 3,000,375 | 9/61  | Golay      | 126—270 |
| 3,019,486 | 2/62  | Stinson    | 18—48   |
| 3,025,851 | 3/62  | Steinberg  | 126—270 |
| 3,038,463 | 6/62  | Daymon     | 126—270 |
| 3,076,450 | 2/63  | Gough et al. | 126—271 |
| 3,106,201 | 10/63 | Steinberg  | 126—270 |

JAMES W. WESTHAVER, *Primary Examiner.*

FREDERICK L. MATTESON, JR., *Examiner.*